Oct. 16, 1923.
H. W. KRANZ
DISK WHEEL
Filed Aug. 7, 1922
1,470,626
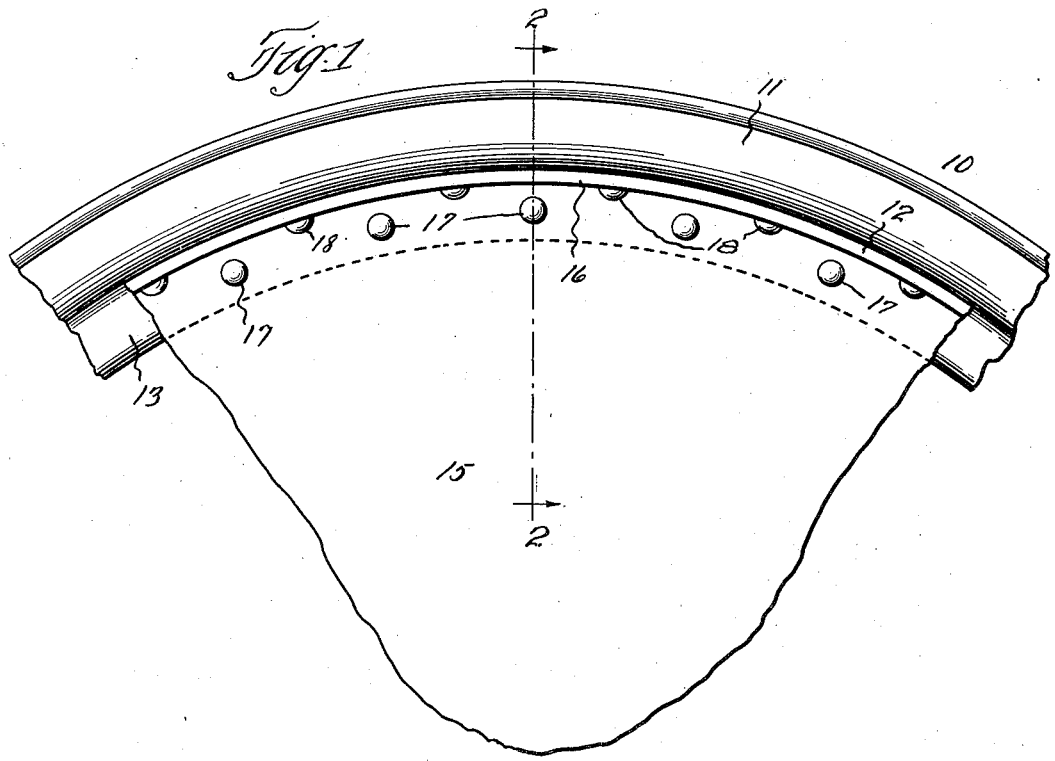
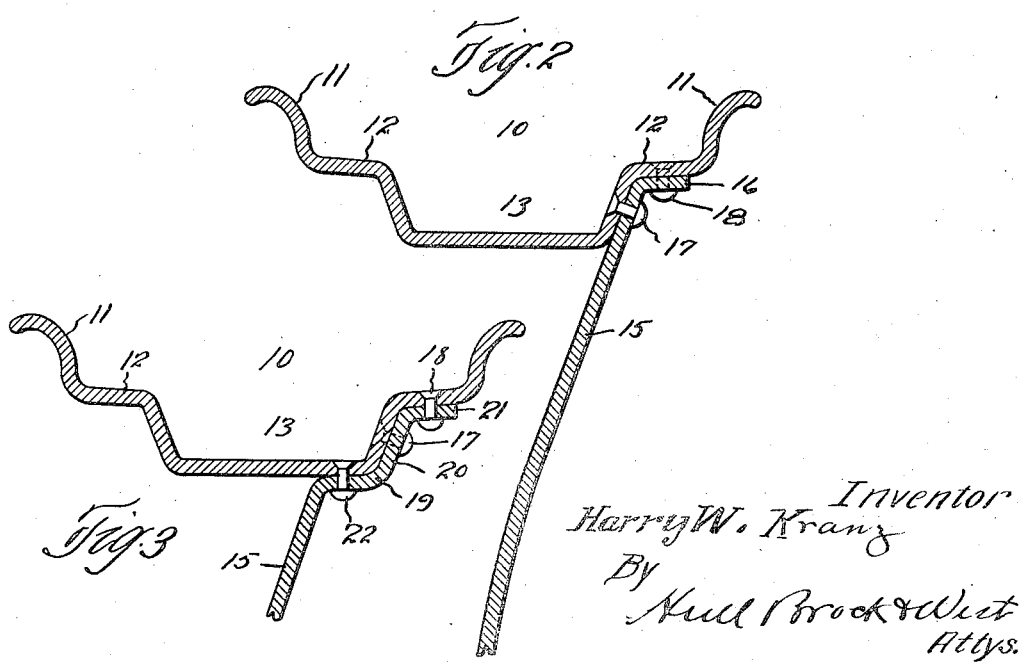
Inventor
Harry W. Kranz
By Null Brock & West
Attys.

Patented Oct. 16, 1923.

1,470,626

UNITED STATES PATENT OFFICE.

HARRY W. KRANZ, OF CLEVELAND, OHIO, ASSIGNOR TO THE HYDRAULIC STEEL COMPANY, OF CLEVELAND, OHIO, A CORPORATION OF OHIO.

DISK WHEEL.

Application filed August 7, 1922. Serial No. 580,067.

*To all whom it may concern:*

Be it known that I, HARRY W. KRANZ, a citizen of the United States, residing at Cleveland, in the county of Cuyahoga and State of Ohio, have invented a certain new and useful Improvement in Disk Wheels, of which the following is a full, clear, and exact description, reference being had to the accompanying drawings.

This invention relates generally to disk wheels and more particularly to a disk wheel employed in connection with a tire carrying rim permanently connected to the periphery of the disk, the object being to provide a simple and inexpensive connection between the rim and disk, and another object is to employ in connection with a sheet metal disk a tire carrying rim having a central depressed portion into which the tire bead can be projected at one side of the rim in order to clear the tire bead from the opposite side of said rim.

With these various objects in view the invention consists in the novel features of construction and in the manner of combining or arranging the same, all of which will be fully described hereinafter and pointed out in the claims.

In the drawings forming part of this specification Fig. 1 is a side view of a portion of a disk wheel embodying one form of my invention; Fig. 2 is a sectional view on the line 2—2 of Fig. 1; and Fig. 3 is a sectional view showing a slightly modified mode of attachment.

In carrying out my invention I employ a one piece tire carrying rim 10 having the side flanges 11 and the base portions 12, the tire beads resting upon the base portions 12 when the tire is inflated. The rim is also formed with an inwardly projecting portion 13 arranged centrally of the base portions 12 and of such depth that the tire bead can be pushed into the same at one side of the rim when it is desired to remove the tire bead from the opposite side of the rim. This tire carrying rim 10 is not only in one piece but is not divided at any point nor is it provided with any separable tire engaging rings or flanges.

In connection with this tire carrying rim I employ a sheet metal disk 15 which at its center may be of any suitable shape for connection to the hub of the wheel body. At its periphery it is bent as shown at 16 in order to engage the inner side of the base portion 12 and the angle of the disk with reference to the flange portion 16 is such that the disk will firmly contact with the side of the inwardly projecting portion 13 of the rim. The periphery of the disk and the rim are united by means of rivets 17 which pass through the disk and depending portion of the rim and the rivets 18 which pass through the flange 16 and the base portion 12 and it will be noted that these rivets 17 and 18 alternate as most clearly shown in Fig. 1.

It will also be understood that the disk can be connected to either side of the rim according to the inclination of the disk. In Fig. 3 I have shown a slight modification of the manner of attaching the disk to the rim and in this instance the disk 15 is first bent laterally outwardly as shown at 19, then obliquely outwardly as shown at 20 and then laterally outwardly again as shown at 21 and the portion 21 is connected as previously described by the rivets 18 and the portion 20 is connected by the rivets 17 and the part 19 is secured to the base of the inwardly projecting portion 13 by means of rivets 22. By means of this construction the periphery of the disk is considerably strengthened and the support for the rim is increased and also placed at a point closer to the plane of the wheel.

The disk wheel constructed as herein shown and described can be made demountable at the hub if so desired or it can be permanently connected to the hub and the tire shoe detached from the rim by deflating the tire and pushing in the bead at one side and thereby clearing the bead at the other side from the rim.

Having thus described my invention, what I claim is:

1. The combination with a tire carrying rim having an inwardly projecting base portion and spaced tire bead seats upon opposite sides of said inwardly projecting portion, and a disk having a lateral peripheral flange, said flange being secured to the inner face of the bead seat portion of the rim, the adjacent portion of the disk being connected to the adjacent wall of the inwardly projecting portion of said rim.

2. In a wheel the combination with a disk having a laterally turned peripheral edge, of a tire carrying rim having an inwardly projecting base portion and a laterally extending portion, the angled edge of the disk seating in the angled portion of the rim and means for uniting the rim and disk.

3. The combination with a tire carrying rim having an inwardly extending base portion and spaced tire bead seats upon opposite sides of said base portion, and a disk having circumferentially extending radially spaced offset portions, the outer of said offset portions being secured to the under side of one of said tire bead seats and the inner of said offset portions being secured to the bottom of said base portion.

4. The combination with a tire carrying rim having an inwardly extending base portion and spaced tire bead seats upon opposite sides of said base portion, and a disk having circumferentially extending radially spaced offset portions, the outer of said offset portions being secured to the under side of one of said tire bead seats and the inner of said offset portions being secured to the bottom of said base portion, and the radial portion of the disk between the circumferential offset portions being connected to the adjacent wall of the inwardly projecting base portion of said rim.

In testimony whereof, I hereunto affix my signature.

HARRY W. KRANZ.